F. T. WAKEFIELD.
COMBINED MAIL BOX AND MILK BOTTLE HOLDER.
APPLICATION FILED JAN. 7, 1915.
1,154,900.
Patented Sept. 28, 1915.
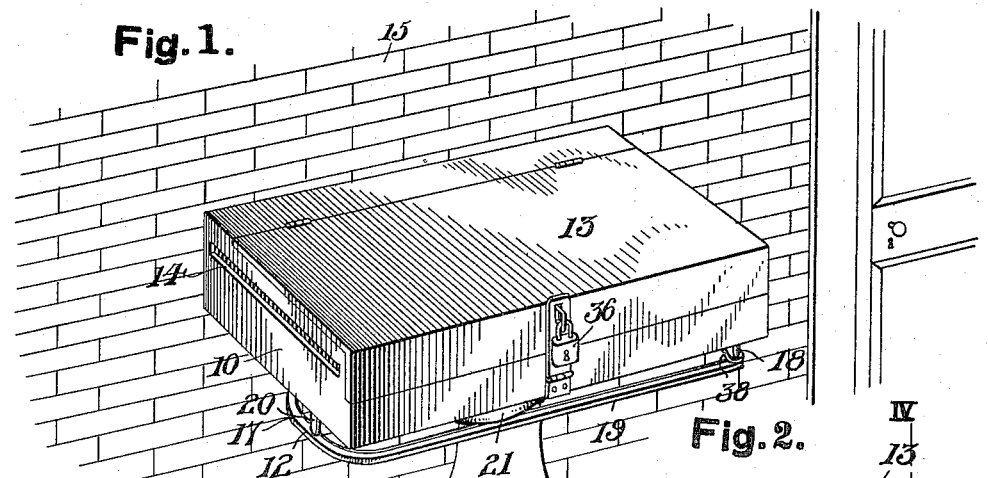
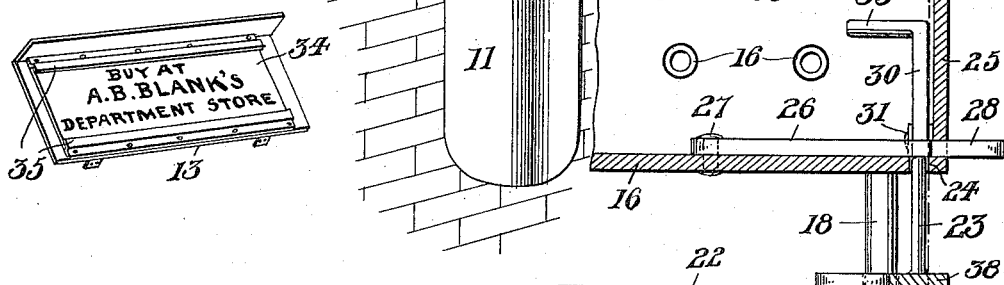
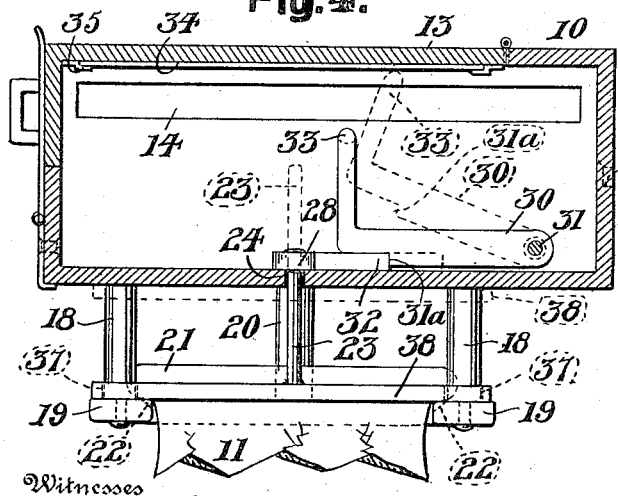
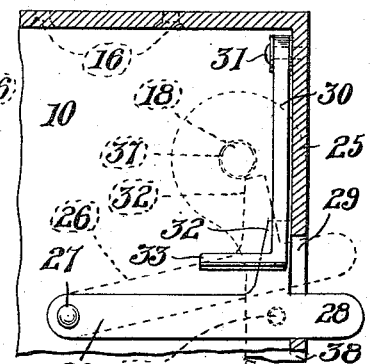
Inventor
Frank T. Wakefield.
Witnesses
M. E. Lowry
D. W. Bryant
By N. M. Wilson
Attorney

UNITED STATES PATENT OFFICE.

FRANK T. WAKEFIELD, OF FAIRHAVEN, PENNSYLVANIA.

COMBINED MAIL-BOX AND MILK-BOTTLE HOLDER.

1,154,900.   Specification of Letters Patent.   Patented Sept. 28, 1915.

Application filed January 7, 1915. Serial No. 957.

*To all whom it may concern:*

Be it known that I, FRANK T. WAKEFIELD, a citizen of the United States, residing at Fairhaven, in the county of Allegheny and State of Pennsylvania, have invented certain new and useful Improvements in Combined Mail-Boxes and Milk-Bottle Holders, of which the following is a specification.

This invention relates to certain new and useful improvements in combined mail box and milk bottle holder.

The primary object of this invention is to provide a receptacle for mail, and in connection therewith, a supporting rack in which a milk bottle may be readily positioned, supported therein, and locked against being removed by any unauthorized person.

A further object is to provide a device for preventing theft of milk bottles which are delivered to the customer and are commonly left by the milk dealer upon a door-step or other convenient place, the device being in the form of a rack in which one or more milk bottles may be quickly positioned, being supported by the top bead or flange of the bottle, while the bottle is locked against removal and is prevented from being spilled and also from being tampered with at the mouth thereof.

A still further object of this invention is to provide a milk bottle rack secured beneath such a horizontal support as the bottom of a mail box, a bottle being readily positionable within the rack by a locking catch thereof manually shifted into position, but being incapable of being released until the mail box or upper side of the support is rendered accessible.

With these general objects in view and others that will appear as the nature of the invention is better understood, the same consists in the novel combination and arrangement of parts hereinafter more fully described, illustrated in the accompanying drawings and set forth in the appended claims.

In the drawings forming a part of this application and in which like designating characters refer to corresponding parts throughout the several views:—Figure 1 is a perspective view of the milk bottle rack attached to a mail box, the latter being suitably secured to the wall of a house. Fig. 2 is a central longitudinal vertical sectional view through an end portion of the mail box and the bottle rack. Fig. 3 is a horizontal sectional view through a similar end portion of the mail box showing the locking latch for the bottle rack in plan in its locked position, and being shown in dotted lines as positioned when unlocked. Fig. 4 is a transverse vertical sectional view taken upon line IV—IV of Fig. 2, and showing the rack in end elevation in dotted lines as released, the milk bottle being broken away, and, Fig. 5 is a perspective view on a somewhat smaller scale, of the inner side of the mail box lid or cover detached from the box.

While the present invention is primarily designed for securing supported milk bottles against theft, it is also contemplated that the latch mechanism for the bottle rack be inclosed within a receptacle such as a mail box 10, so that the bottle such as 11, which is illustrated as being mounted in the rack 12, can only be released by gaining access to the latch for releasing the same by opening the closure lid 13 of the mail box. The said box is provided with a mail entrance slot 14 and is fixedly mounted in a horizontal position upon any desired support, preferably against a wall 15, although it will be understood that the mail box may be rigidly secured to any suitable support, it being only necessary that the rack support, here shown as in the form of a mail box, be adapted for mounting said rack 12 thereon in a horizontal position. Where fastened to the side of a house as shown, screws or like fastening means may be used, being passed through holes 16 provided therefor in the rear wall of the box.

The rack consists mainly of a metallic arch or U-shaped frame 17 secured in a horizontal position parallel with the bottom of the mail box by means of opposite posts 18 at the free ends of the parallel sides 19 of the frame and also by an end post 20 their inner edges 22 for the reception of the frame, the spacing between the bottom of the box and the rack being such as to permit the entrance of the mouth end of the bottle 11.

The sides 19 of the frame are also spaced sufficiently far apart for allowing the neck of the milk bottle 11 to be readily slid within the frame and between the sides 19 thereof and with the top bead or flange of the bottle slidably seated upon the frame sides as best illustrated in Fig. 4, it being noted that the said sides are preferably beveled at their inner edges 22 for the reception of the bottle flange.

A slightly curved locking bar 38 is mounted on the posts 18 for normally closing the open end of the frame 17 and is vertically shiftable upon the posts 18 by means of the openings 37 in the said bar, while a central pin 23 is carried by the said bar and slidably projects upwardly through a bottom perforation 24 in the mail box adjacent the end 25 thereof.

A swinging latch 26 is pivoted to a pin 27 within the box on the bottom thereof adjacent the end 25 of the box, and has a handle or free end 28 projecting through a slot 29 in the said box end 25, whereby the latch may be readily shifted for covering or uncovering the perforation 24, as best illustrated in Fig. 3. A locking latch 30 is pivoted as at 31 within the box to the end 25 thereof and has a bottom shoulder 31ª engageable with a laterally projecting arm 32 of the latch 26 when the latter is seated over the perforation 24, while the catch 30 has a handle 33 at the free end thereof by means of which the catch 30 may be lifted out of engagement with the latch 26, as best illustrated in Fig. 4, whereby the latch may be shifted away from the said perforation by slidably moving the latch handle, which will then allow the lock bar 38 and its pin 23 to be elevated as shown by dotted lines in Fig. 4, so that the milk bottle being released, the same may be slidably removed from the rack.

The lid 13 of the mail box may be provided with guides 35 upon its inner face for removably securing therein an advertising card as 34 that will be exposed to view at all times when the lid 13 is in its open position.

From this detailed description of the device, the complete operation thereof will be apparent, it being understood that the mail box is normally retained closed by a padlock or equivalent locking device 36, while the latch 26 leaves the perforation normally uncovered, the catch 30 being released and freely resting of its own weight upon the upper face of the arm 32 and disengaged therefrom. This normal position of the members allows the milkman to readily elevate the locking bar 38 and slidably position the milk bottle or bottles in the rack. When the bottle is so positioned, the latch handle 28 is shifted by hand to move the latch 26 to its locked position over the perforation 24 and pin 23 as shown in Fig. 3, whereupon the catch 30 drops into its engagement with the latch arm 32, thus locking the latch 26 against further movement and securing the lock bar 38 in its position, closing the open end of the rack frame. When the bottle or bottles are so locked within the frame, it will be seen that an unauthorized removal therefrom is impossible, while the bottle or bottles can be only slightly tilted and insufficiently to spill the contents thereof; also that the top of the bottle is in too close proximity to the bottom of the box to allow any removal of or tampering with its contents.

The bottle or bottles are removed by releasing the lock 36 and opening the box lid 13 for gaining access to the catch mechanism and when the catch 30 is elevated, the latch 26 may be shifted so as to uncover perforation 24, and allow the elevating of the lock bar 38. The latch 26 is permitted to remain in this unlocked position, so as to be again ready for the reception of milk bottles. It is of course apparent that one or more bottles may be positioned in the rack herein illustrated, while the rack may be secured to any other form of receptacle or support if desired, such as a door, window-sill or ledge.

While the form of the invention herein shown and described is what is believed to be the preferred embodiment thereof, it is nevertheless to be understood that minor changes may be made without departing from the spirit and scope of the invention as set forth in the appended claims.

What I claim as new is:—

1. A device of the class described comprising in combination with a receptacle having a perforation therethrough, a bottle engaging supporting frame secured beneath the bottom thereof, a shiftable lock bar upon said frame, a finger carried by the bar and projecting through the said bottom perforation, and coacting latch and catch members lockingly mounted within said receptacle with respect to said finger and perforation.

2. In combination with a support having a perforation therethrough, a milk bottle rack secured to the said support and having an open end, a bar shiftably positioned spanning the said open end, a finger carried by the said bar and projecting within said perforation, a latch pivoted to said support shiftable transversely over said perforation, and an engaging catch for the said latch.

3. A device of the class described comprising in combination with a receptacle having a bottom provided with a perforation and an end provided with a slot, a bottle supporting rack secured to the said bottom and having an open end, a shiftable closing bar for the said end, a finger upon said bar projecting within the said perforation, a latch pivoted to the upper face of said bottom shiftable across the said perforation and having a free end projecting outwardly through the said slot, and a pivoted catch carried by the inner face of an end wall of said receptacle and shiftable in the path of movement of the said latch.

4. A device of the class described comprising a support, a U-shaped frame mounted upon said support and spaced therefrom, a lock bar shiftably mounted spanning the open end of the said frame, a finger carried by said bar, a shiftable latch carried by said support having a path of movement transversely of the free end of said finger, and an automatic engaging catch for the said latch.

5. A device of the class described comprising a horizontal support having a perforation therethrough, a U-shaped frame positioned in parallel relation to the lower side of said support and having the inner edges of the sides thereof beveled, securing posts between the said frame and support, a lock bar spanning the open end of the said frame and movable vertically on two of the said posts, an upwardly extending finger upon said bar projecting within the said perforation, a latch pivoted to the upper face of the said support and having a path of movement across the said perforation and provided with a projecting handle at its free end and with a laterally projecting stop arm, a pivoted catch automatically engageable with the said arm when the latch is in its locked position over the said perforation, and an operating handle for the said catch.

In testimony whereof I affix my signature in presence of two witnesses.

FRANK T. WAKEFIELD.

Witnesses:
GEORGE J. BECKER,
CARL SCHWARM.